United States Patent [19]

Aihara et al.

[11] Patent Number: 5,300,345
[45] Date of Patent: Apr. 5, 1994

[54] NONWOVEN FABRIC MADE OF LAMINATED SLIT SHEET

[75] Inventors: Kintaro Aihara, Chiba; Tadashi Honda, Tokyo, both of Japan

[73] Assignee: Nippon Petrochemicals Company, Limited, Tokyo, Japan

[21] Appl. No.: 769,252

[22] Filed: Oct. 1, 1991

[30] Foreign Application Priority Data

Oct. 4, 1990 [JP] Japan ................... 2-265081

[51] Int. Cl.⁵ ............ B26D 3/08; B32B 3/10; B65H 18/00
[52] U.S. Cl. .................. 428/137; 83/13; 83/52; 83/469; 242/55; 242/62
[58] Field of Search .......................... 428/137

[56] References Cited

U.S. PATENT DOCUMENTS 4,489,630 12/1984 Okada et al. .
4,861,639 8/1989 Vittone et al. ............ 428/105
5,032,442 7/1991 Yamazaki et al. ............ 428/109

FOREIGN PATENT DOCUMENTS 35-10885 8/1960 Japan .
64-46193 3/1989 Japan .

Primary Examiner—James C. Cannon
Attorney, Agent, or Firm—Burns, Doane, Swecker & Mathis

[57] ABSTRACT

A laminated nonwoven fabric comprising a first web having a network structure having laterally extending ribbons and nodes interconnecting longitudinally adjacent ribbons, and a second web laminated to the first web. The first web is fabricated such that one node is laterally shifted from another longitudinally adjacent node so that the nodes are uniformly distributed in the first web. Preferably, the nodes are arranged in a regular pattern and on a line extending oblique to the longitudinal direction of the first web.

4 Claims, 8 Drawing Sheets

NONWOVEN FABRIC MADE OF LAMINATED SLIT SHEET

BACKGROUND OF THE INVENTION

1. Field of the Invention

The present invention relates to a nonwoven fabric fabricated from laminated slit sheet, a method of fabricating such a slit sheet, and a rotary slit forming cutter for fabrication of a slit sheet.

2. Description of the Related Art

A nonwoven fabric can be manufactured by laminating two layers of webs together. A known nonwoven fabric uses a first web comprising a slit sheet having a network structure having generally laterally extending ribbons as if a weft of a woven fabric. The second web may comprise a slit sheet having a network structure having generally longitudinally extending ribbons as if a warp of a woven fabric. Alternately, the second web can be any desired web used as a base layer.

U.S. Pat. No. 4,489,630 discloses a fabrication of such slit sheet. The fabrication of such slit sheet is also disclosed in, for example, Japanese Examined Patent Publication No. 35-10885 and Japanese Unexamined Utility Model Publication No. 64-46193.

The slit sheet is fabricated from a continuous nonporous plastic sheet material by slitting the latter using a rotary slit forming cutter, which has a plurality of cutter edges on the periphery thereof. For fabricating a weft-type slit sheet, the rotary slit forming cutter includes longitudinally spaced rows of cutter edges, each row including a plurality of axially extending cutter edges. For fabricating a warp-type slit sheet, the cutter edges extend circumferentially from the rotary slit forming cutter. The slit sheet can be stretched, before or after the slitting operation, in the direction of the respective slits to strengthen the sheet material and this stretching causes the slits to open and thereby bring the slit sheet into an apertured or fibrillated web having a network structure.

Figure 9:
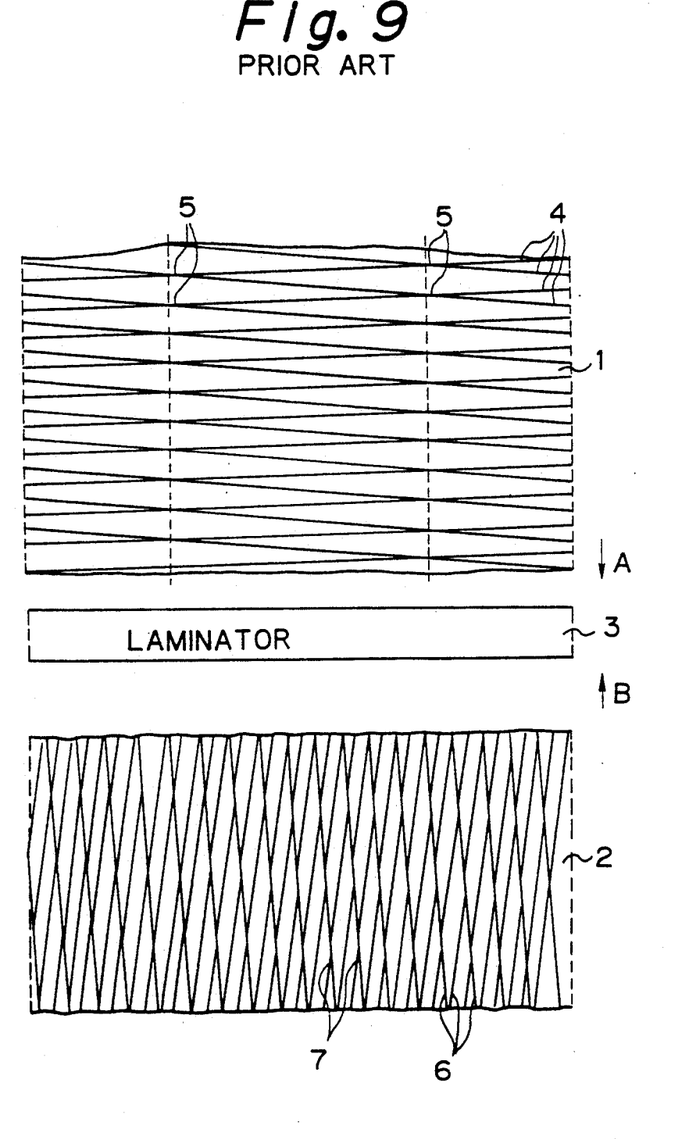
FIG. 9 is a view of a laminating process of the nonwoven fabric of a prior art.

FIG. 9 of the attached drawings shows a laminating process of a weft-type slit sheet or web 1 and a warp-type slit sheet or web 2 for fabricating a nonwoven fabric. The weft-type slit sheet 1 is continuously fed to a laminator 3 according to its longitudinal direction, indicated by the arrow A. It can be seen that the weft-type slit sheet 1 has a network structure having generally laterally extending and longitudinally spaced ribbons 4 and nodes 5 interconnecting longitudinally adjacent ribbons 4. Similarly, the warp-type slit sheet 2 is continuously fed to the laminator 3 according to its longitudinal direction, indicated by the arrow B. The warp-type slit sheet 2 also has a network structure having generally longitudinally extending and laterally spaced ribbons 6 and nodes 7 interconnecting ribbons 6.

Figure 8:
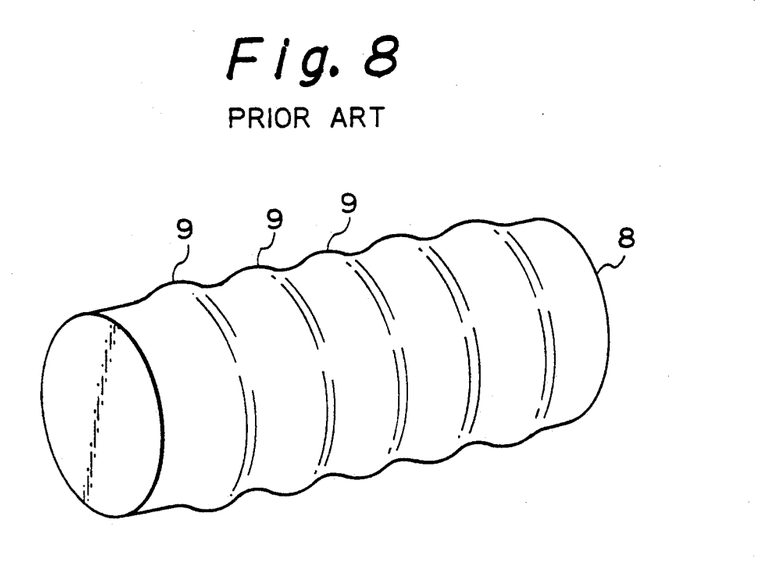
FIG. 8 is a perspective view of a roll of the nonwoven fabric of a prior art.

The nonwoven fabric, comprising the lamination of the weft-type and warp-type slit sheet 1 and 2, is a continuous web and wound in the form of a roll. FIG. 8 of the attached drawings shows a roll of the nonwoven fabric 8. As shown in FIG. 8, a problem arises in the nonwoven fabric 8 that the peripheral surface of the nonwoven fabric 8 is corrugated and includes bulges 9. The corrugated peripheral surface of the nonwoven fabric 8 involves a problem that partial slack areas arise in the web of the nonwoven fabric 8 when it is unwound, for example, for further laminating the nonwoven fabric 8 with a further web, or processing it to manufacture products. When the unwound nonwoven fabric 8 is wound again, wrinkles arise in the nonwoven fabric 8. To avoid these problems, the nonwoven fabric 8 must be wound in a small roll.

SUMMARY OF THE INVENTION

The object of the present invention is to solve the above described problems and to provide a nonwoven fabric fabricated from laminated slit sheet that can be wound in the form of a roll having a smooth peripheral surface to thereby prevent slack when it is unwound.

The further object of the present invention is to provide a method of fabricating a slit sheet adapted for use in the above described nonwoven fabric, and a rotary slit forming cutter for fabrication of a slit sheet.

According to the present invention, there is provided a laminated nonwoven fabric comprising a first web having a longitudinal direction and a network structure having generally laterally extending and longitudinally spaced ribbons and nodes interconnecting longitudinally adjacent ribbons, and a second web laminated to the first web, wherein one node is laterally shifted from another longitudinally adjacent node so that the nodes are uniformly distributed in the first web. The second web may preferably comprise a slit sheet having a network structure of generally longitudinally extending ribbons, but it can be any desired web used as a base layer.

It has been found that, in the case of the prior art such as shown in FIG. 8, when the bulges appear in the peripheral surface of the roll of the nonwoven fabric, the positions of the bulges correspond to the positions of the nodes interconnecting laterally extending and longitudinally adjacent ribbons of the weft-type slit sheet. This is because the nodes repeatedly appear on the same lines extending parallel to the longitudinal direction of the weft-type slit sheet. According to the present invention, the nodes are uniformly distributed in the first web, which can be compared with the weft-type slit sheet, and it is thus possible to wind the laminated nonwoven fabric having a smooth peripheral surface of the resultant roll of the nonwoven fabric.

According to the present invention, there is provided a method of fabricating a slit sheet having a plurality of generally laterally extending slits in rows from a continuous nonporous sheet material having a longitudinal direction. The method comprises the steps of: forming a first row of generally laterally extending slits; forming a second longitudinally adjacent row of generally laterally extending slits; the slits of the second row being staggered relative to the slits of the first row; forming a third longitudinally adjacent row of generally laterally extending slits; the slits of the third row being staggered relative to the slits of the second row and laterally shifted from the slits of the first row; forming a fourth longitudinally adjacent row of generally laterally extending slits; the slits of the fourth row being staggered relative to the slits of the third row and laterally shifted from the slits of the second row; and cyclically repeating the formation of the first, second, third and fourth rows of slits.

Further, according to the present invention, there is provided a rotary slit forming cutter for fabrication of a slit sheet having a plurality of generally laterally extending slits in rows, the rotary slit forming cutter comprising a rotatable body having an axis of rotation and an periphery thereof, and a plurality of rows of axially extending cutter edges arranged on the periphery of the rotatable body such that the cutter edges of the adjacent rows are staggered and the cutter edges of every adjacent row are laterally shifted so that the cutter edges of every adjacent row are arranged on lines extending oblique to the longitudinal direction of the sheet material.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
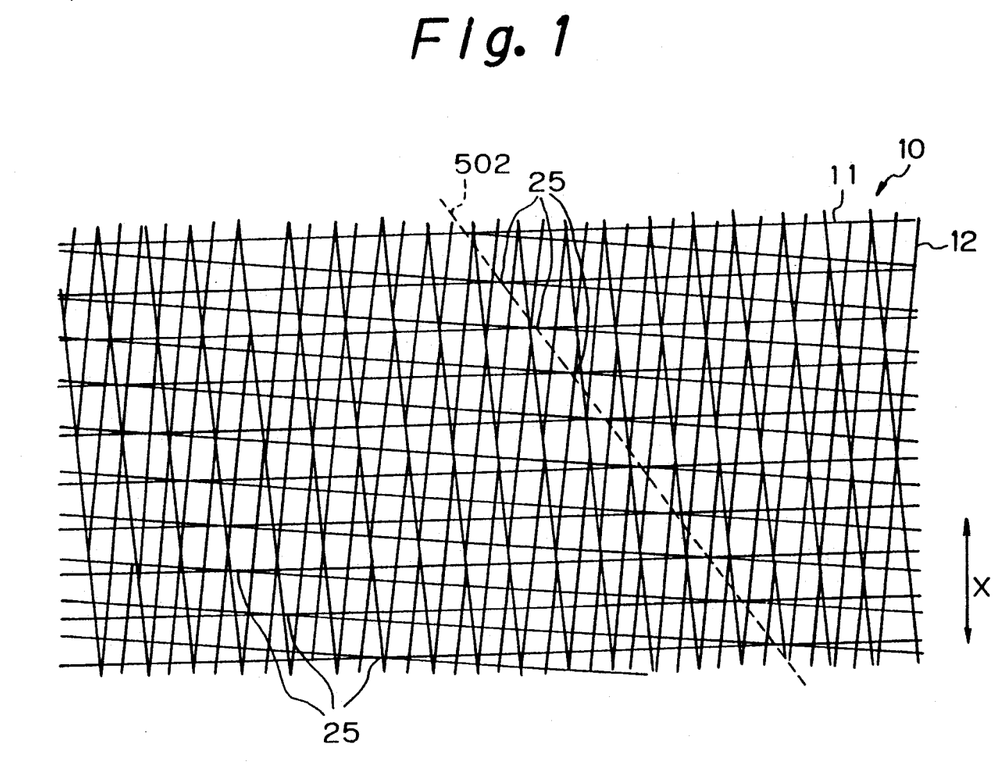
FIG. 1 is a plan view of a nonwoven fabric according to the embodiment of the present invention.
Figure 2:
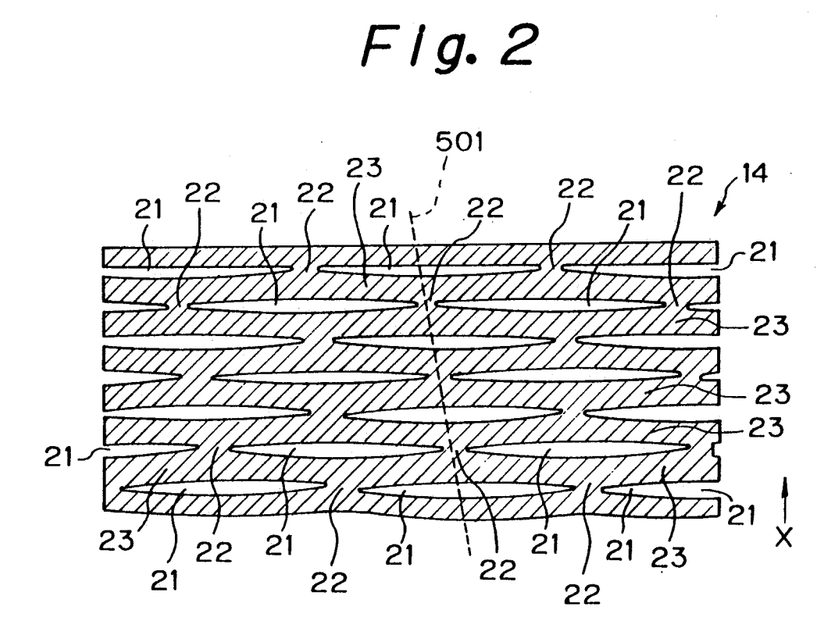
FIG. 2 is a plan view of a first split sheet for fabrication of the nonwoven fabric.
Figure 3:
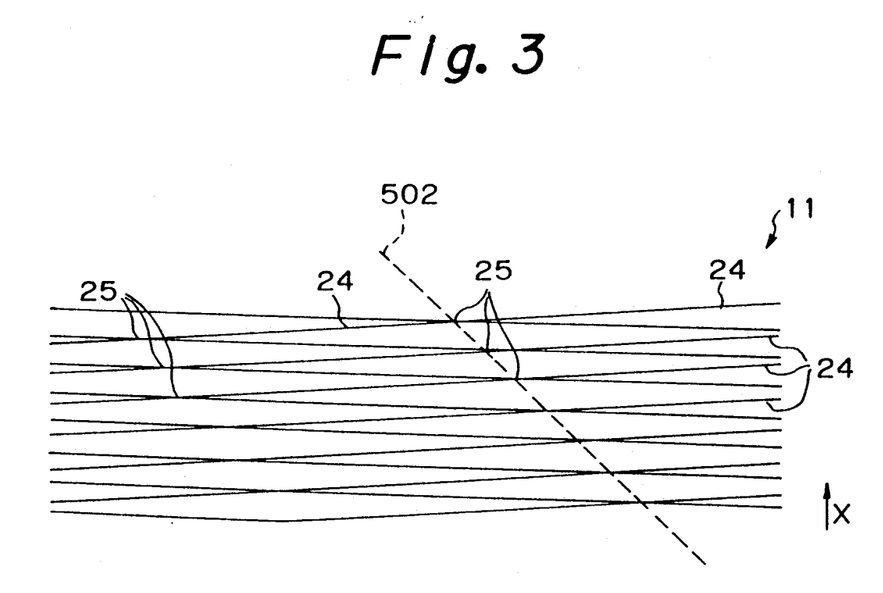
FIG. 3 is a plan view of the first split sheet of FIG. 2 after it is stretched.
Figure 4:
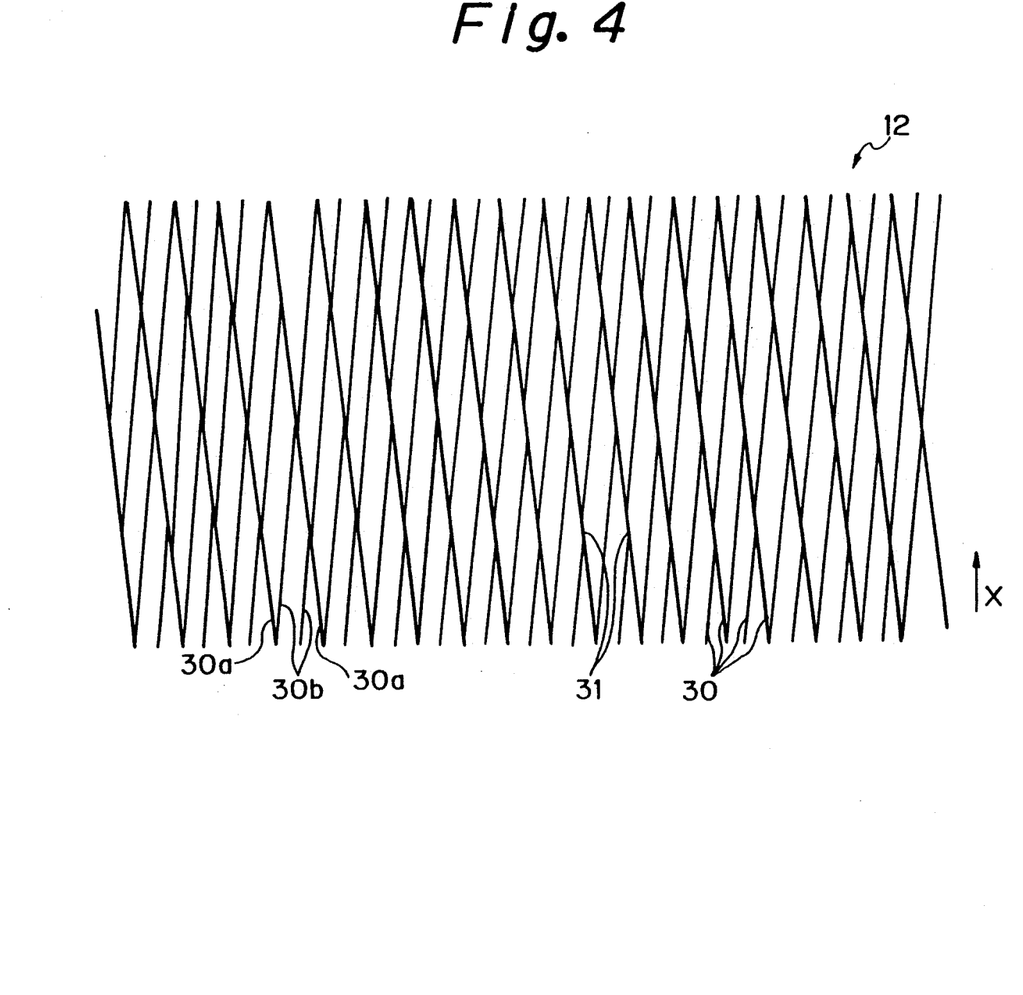
FIG. 4 is a plan view of a second split sheet after it is stretched for fabrication of the nonwoven fabric.

FIG. 1 shows a nonwoven fabric 10 comprising a lamination of two layers of webs 11 and 12. An arrow X shows the longitudinal direction of the webs 11 and 12. The first web 11 is also shown in FIG. 3 and the second web 12 is also shown in FIG. 4. The first web 11 is obtained by stretching a slit sheet 14, shown in FIG. 2, which is fabricated from a continuous nonporous plastic sheet material 15 (FIG. 5) supplied from a roll thereof, such as a thermoplastic film, in particular, low density polyethylene, medium density polyethylene, high density polyethylene, isotactic polypropylene, and its mixture. It is also possible to add an additive, such as antioxidant, ultraviolet absorber, pigment, carbon black or inorganic filler, to a thermoplastic film.

Figure 5:
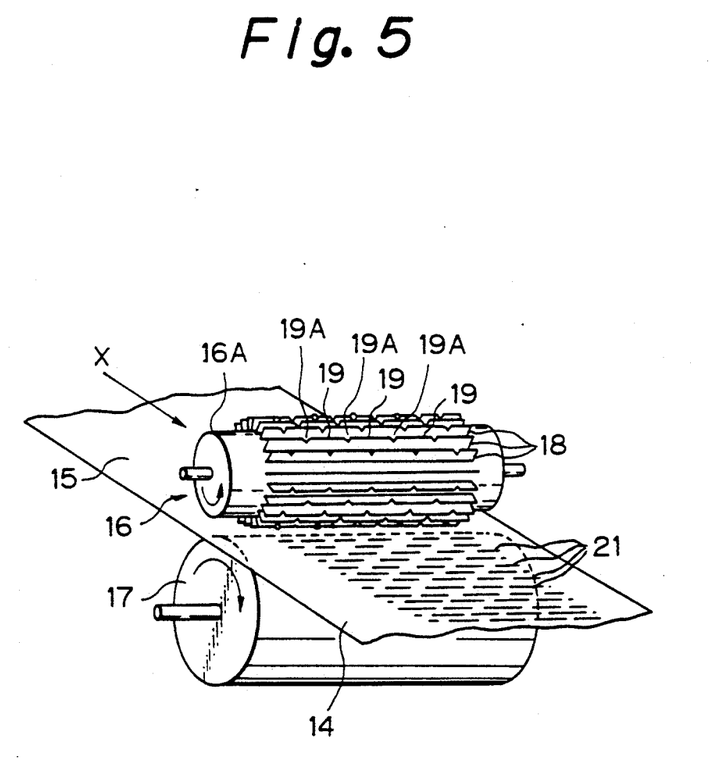
FIG. 5 is a perspective view of the rotary slit forming cutter.

As shown in FIG. 5, the continuous nonporous plastic sheet material 15 is fed, in the direction of the arrow X, into a gap between a rotary slit forming cutter 16 and a backing roll 17 against which the rotary slit forming cutter 16 is pressed. The rotary slit forming cutter 16 and the backing roll 17 are driven in the respective directions, as indicated by respective arrows.

The rotary slit forming cutter 16 comprises a rotatable cylindrical body 16A and a plurality of axially extending cutter blades 18 fixedly secured in axial slots on the peripheral surface of the rotatable cylindrical body 16A. Each cutter blade 18 includes a row of cutter edges 19 separated by notches 19A provided at the tip of the cutter blade 18. It is possible to set up each row of the cutter edges 19 on the peripheral surface of the rotatable cylindrical body 16A.

Figure 6:
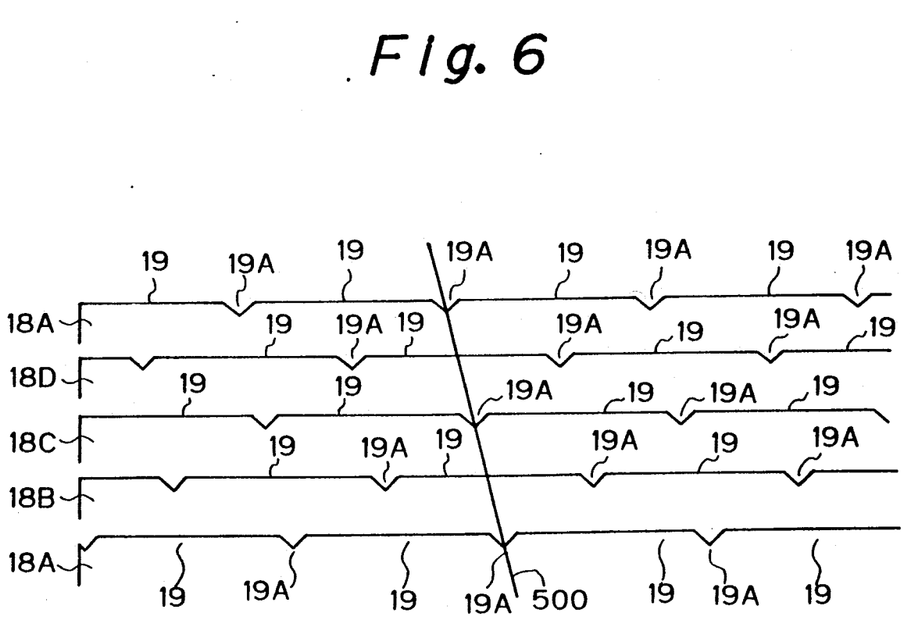
FIG. 6 is a view showing an arrangement of the cutter edge of the rotary slit forming cutter of FIG. 5.

A detailed arrangement of the cutter edges 19 and the notches 19A are shown in FIG. 6, in which the cutter blades 18 are indicated by the character 18A, 18B, 18C, and 18D in accordance with the order on the rotatable cylindrical body 16A. As shown in FIG. 6, the cutter edges 19 of the adjacent cutter blades (rows), for example, 18A and 18B, and 18B and 18C are staggered and the cutter edges 19 of every adjacent blade (rows), for example, 18A and 18C, and 18B and 18D are laterally shifted so that the cutter edges 19 of every adjacent blade (rows) 18 are arranged on lines (one of which is indicated by the numeral 500) extending oblique to the longitudinal direction of the sheet material.

As shown in FIG. 5, the cutter edges 19 are forced in the continuous nonporous plastic sheet material 15 to sever slits 21 therethrough to obtain the slit sheet 14. Alternately, the cutter edges 19 can be of the type that is heated to weld the continuous nonporous plastic sheet material 15 to form slits 21. FIG. 2 shows the detail of the thus obtained slit sheet 14, in which hatching is applied to a region of the material of the sheet around the rows of slits 21. Portions 22 of the sheet material between the laterally adjacent slits 21 in each row correspond to positions of the notches 19A separating the cutter edges 19 and are arranged on lines (one of which is indicated by the numeral 501) extending oblique to the longitudinal direction of the sheet material in correspondence with the line 500.

Portions 23 of the sheet material between the longitudinally adjacent rows of the slits 21 extend laterally from the slit sheet 14 and become generally laterally extending narrow ribbons 24, as shown in FIG. 3, when the slit sheet 14 is stretched in the lateral direction thereof perpendicular to the longitudinal direction X. As shown in FIG. 3, the laterally extending and longitudinally adjacent ribbons 24 are interconnected by nodes 25, that correspond to the portions 22 of the sheet material between the laterally adjacent slits 21 in each row. One node 25 is laterally shifted from another longitudinally adjacent node 25 so that the nodes 25 are uniformly distributed in the slit sheet or the first web 11. In the embodiment, the nodes 25 are arranged in a regular pattern and on lines (one of which is indicated by the numeral 502) extending oblique to the longitudinal direction X. A pitch between the laterally adjacent nodes 25 is greater than a pitch between the longitudinally adjacent nodes 25, due to the fact that the slits 21 extend laterally and the slit sheet 11 is stretched laterally.

As will be clear from the description of FIG. 6, the slit sheet 14 or 11 can be fabricated by the steps of: forming a first row of generally laterally extending slits 21, for example, by the first cutting blade 18A; forming a second longitudinally adjacent row of generally laterally extending slits 21, for example, by the second cutting blade 18B, the slits 21 of the second row being staggered relative to the slits 21 of the first row; forming a third longitudinally next adjacent row of generally laterally extending slits 21, for example, by the third cutting blade 18C, the slits 21 of the third row being staggered relative to the slits 21 of the second row and laterally shifted from the slits 21 of the first row; forming a fourth longitudinally next adjacent row of generally laterally extending slits 21, for example, by the fourth cutting blade 18D, the slits 21 of the fourth row being staggered relative to the slits 21 of the third row and laterally shifted from the slits 21 of the second row; and cyclically repeating the formation of the first, second third and fourth rows of slits 21.

As shown in FIG. 4, the second web 12 has a network structure having generally longitudinally extending and laterally spaced ribbons 30 and nodes 31 interconnecting laterally adjacent ribbons 30. In particular, the ribbons 30 consists of thick ribbons 30a and thin ribbons 30b. The second web 12 can be fabricated by longitudinally slitting a continuous nonporous plastic sheet material using a rotary slit forming cutter having cutter edges extending circumferentially thereof, and by longitudinally stretching it before or after the slitting. Then the second web 12 is crosswise laminated to the first web 11 with the ribbons 30 of the second web 12 crossed to the ribbons 24 of the first web 11, in a manner described with reference to FIG. 9. The laminator 3 may be any conventionally available one, for example, a pair of heated laminating rollers between which the first and second webs 11 and 12 are compressively passed.

The second web may preferably comprise a slit sheet having longitudinally extending ribbons 30, but it can be any desired web used as a base layer. For example, a plurality of parallel yarns, a stretched tape, a paper, or a nonporous film can be used. It is possible to obtain a longitudinally and laterally strengthened nonwoven fabric if the second web has a longitudinal strength since the laterally stretched first web has a lateral strength.

Figure 7:
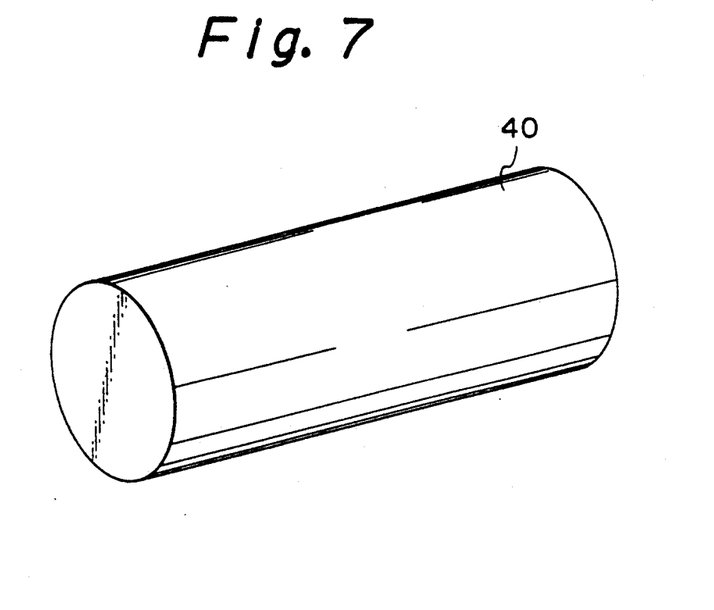
FIG. 7 is a perspective view of a roll of the nonwoven fabric according to the present invention.

In the above described nonwoven fabric 10, the nodes 25 are not concentrically arranged on lines extending longitudinally from the first web 11, but arranged on lines 502 oblique to the longitudinal direction of the first web 11. Therefore, it can be said that the nodes 25 are uniformly distributed in the first web 11 that is continuous and long enough, such as that wound in the form of a roll. It is thus possible to wind the laminated nonwoven fabric 10 in the form of a roll with a smooth peripheral surface of the resultant roll of the nonwoven fabric 40, as shown in FIG. 7. Thus the roll of the nonwoven fabric 40 can be unwound without creating slack in the web.

We claim:

1. A laminated nonwoven fabric comprising a first web having a longitudinal direction and a network structure having generally laterally extending and longitudinally spaced ribbons and nodes interconnecting longitudinally adjacent ribbons, and a second web laminated to the first web, said first web being comprised of a first slit sheet that is stretched in a direction transverse to the longitudinal direction, said first slit sheet including longitudinally arranged first and third rows of slits separated by a second row of slits, the slits in each row being separated by material portions of the sheet that correspond to said nodes when the first slit sheet is transversely stretched, the slits in the first and third rows of slits being laterally offset with respect to one another so that the material portions between slits in the first and third rows are positioned along lines that extend oblique to the longitudinal direction, the nodes of said first web being uniformly distributed in the first web, the nodes in the first web which correspond to the material portions in the first and third rows of the first slit sheet being arranged along lines that extend oblique to the longitudinal direction.

2. A laminated nonwoven fabric according to claim 1, wherein the nodes are arranged in a regular pattern.

3. A laminated nonwoven fabric according to claim 1, wherein the second web has a longitudinal direction and a network structure having generally longitudinally extending and laterally spaced ribbons and nodes interconnecting laterally adjacent ribbons, and the second web is crosswise laminated to the first web with the ribbons of the second web crossed to the ribbons of the first web.

4. A laminated nonwoven fabric according to claim 3, wherein a pitch between the laterally adjacent nodes of the first web is greater than a pitch between the longitudinally adjacent nodes of the second web.

* * * * *